(12) United States Patent
Schlipf (10) Patent No.: US 11,279,059 B2
(45) Date of Patent: Mar. 22, 2022

(54) METHOD FOR PRODUCING AN ELECTRICAL HEATING DEVICE

(71) Applicant: Türk & Hillinger GmbH, Tuttlingen (DE)

(72) Inventor: Andreas Schlipf, Tuttlingen (DE)

(73) Assignee: TÜRK & HILLINGER GMBH, Tuttlingen (DE)

( * ) Notice: Subject to any disclaimer, the term of this patent is extended or adjusted under 35 U.S.C. 154(b) by 453 days.

(21) Appl. No.: 16/386,928

(22) Filed: Apr. 17, 2019

(65) Prior Publication Data

US 2019/0322006 A1   Oct. 24, 2019

(30) Foreign Application Priority Data

Apr. 19, 2018 (DE) ............... 10 2018 109 306.3

(51) Int. Cl.
| | |
|---|---|
| *B28B 23/00* | (2006.01) |
| *H05B 3/46* | (2006.01) |
| *H01C 17/02* | (2006.01) |
| *B23P 11/00* | (2006.01) |

(52) U.S. Cl.
CPC ............ *B28B 23/00* (2013.01); *B23P 11/005* (2013.01); *H01C 17/02* (2013.01); *H05B 3/46* (2013.01)

(58) Field of Classification Search
CPC ... B28B 23/00; B29C 2045/2743; H05B 3/40; H05B 3/48
See application file for complete search history.

(56) References Cited

U.S. PATENT DOCUMENTS 6,069,910 A * 5/2000 Eckert ............... H05B 3/0009
373/42
2010/0147826 A1   6/2010 Schlipf

FOREIGN PATENT DOCUMENTS

| DE | 202008016439 U1 | 3/2009 | |
| DE | 102014108919 A1 * | 1/2015 | .............. H05B 3/42 |
| DE | 102014108919 A1 | 1/2015 | |
| DE | 202017100531 U1 | 2/2017 | |
| EP | 2180759 A1 * | 4/2010 | .............. H05B 3/48 |

* cited by examiner

*Primary Examiner* — Kelly M Gambetta
*Assistant Examiner* — Virak Nguon
(74) *Attorney, Agent, or Firm* — Panitch Schwarze Belisario & Nadel LLP (57) ABSTRACT

A method for producing an electrical heating device with the steps of preparing a sleeve from a first material that has a first strength; arranging an electrical heating element in the sleeve; arranging of a filler material in the sleeve, so that parts of the electrical heating element carrying current are electrically isolated from the sleeve and the position of the electrical heating element in the sleeve is fixed, and at least section-wise compression of the sleeve, of the electrical heating element is arranged in sections of the sleeve that are compressed, and of the filler material arranged in sections of the sleeve that are compressed, wherein, before the completion of the at least section-wise compression of the sleeve, in sections to be compressed, a tubular section is arranged that is made from a second material that has a second strength higher than the first strength.

12 Claims, 7 Drawing Sheets

METHOD FOR PRODUCING AN ELECTRICAL HEATING DEVICE

CROSS-REFERENCE TO RELATED APPLICATIONS

This application claims priority to German Patent Application No. 10 2018 109 306.3, filed on Apr. 19, 2018. The entirety of the aforementioned application is incorporated herein by reference in its entirety.

BACKGROUND OF THE INVENTION

Electrical heating devices that have a sleeve with an electrical heating element arranged therein, whose parts carrying current are electrically isolated from the sleeve, are a standard mechanism for the electrical heating of objects and/or media.

For many actual embodiments of such electrical heating devices, there is, on one hand, the desire for the highest possible compression, in order to guarantee the best possible heat conduction from the electrical heating device to the sleeve that is brought into contact with the object or medium, while, simultaneously, the applicable compression must be limited, at least locally, for example, because other, pressure-sensitive elements, e.g., electronic components, are arranged in the sleeve at some positions or because deformation caused by too much compression is not desired. This is taken into account by compressing the sleeve to different degrees in different sections.

However, up to now the implementation of this approach in production processing has proven not to be very reliable. In other electrical heating cartridges, there are production problems in that the strength of the jacket material is not strong enough, for example, when a sleeve made from high-purity titanium is desired for medical applications.

Therefore, the problem of the invention is to disclose a method for producing an electrical heating device, especially a heating cartridge or a tubular heating body, that is improved especially with respect to its processing reliability.

This problem is solved by a method with the features of claim 1. Advantageous refinements of the method are the subject matter of the dependent claims.

BRIEF SUMMARY OF THE INVENTION

The method according to the invention for producing an electrical heating device has the steps of:

Preparation of a sleeve made from a first material that has a first strength,

Arrangement of an electrical heating element in the sleeve,

Arrangement of a filler material in the sleeve, so that parts of the electrical heating element carrying current are electrically isolated from the sleeve and the position of the electrical heating element in the sleeve is fixed, and At least section-wise compression of the sleeve, of the electrical heating element arranged in sections of the sleeve that are compressed, and of the filler material arranged in sections of the sleeve that are compressed.

It is preferable to the invention that, before the completion of the at least section-wise compression of the sleeve, in sections to be compressed, a tubular section is arranged that is made from a second material that has a second strength that is higher than the first strength.

In this way, the compression of the electrical heating device can be achieved with high precision and with process-reliable, highly reproducible results.

This applies especially to electrical heating devices with areas that are compressed to different degrees, because the area in which a given compression is achieved can be defined locally in this way and a controlled graduation of different degrees of compression can be implemented. In addition, the annular clamping force with the compression is assured by the additional tubular section made from a material with higher strength.

At this point it should be explicitly noted that the step of the at least section-wise compression is naturally also realized if the entire electrical heating device is simultaneously compressed.

The electrical heating element can here be, for example, a resistance wire wound on a coil body, especially a ceramic coil form, a self-supporting resistance wire, or also an embedded and positioned heating wire coil.

The filler material is usually an electrically isolating material with the highest possible heat conductivity. In particular, it could be magnesium oxide granulate.

The arrangement of this filler material in the sleeve can suggest, in particular, the filling of an insulating powder, insulating granular, or other insulating parts.

According to one especially preferred embodiment of the method, the material from which the sleeve is made is copper, aluminum, titanium, or brass, so that a sleeve made from copper, aluminum, titanium, or brass is prepared. All of these materials have in common that they have relatively good heat conductivity, but not very high strength.

The sleeve that is preferably constructed as a tube that is closed on one side is preferably prepared in that, during manufacturing, it is subjected to cutting processes from a solid blank, deep-drawing processes from a metal sheet, or multiple die press processes.

The preferred material for the tubular sections to be arranged in sections to be compressed is a steel, especially a stainless steel, that is, a high-strength material.

In one preferred embodiment of the invention, it is provided that the arrangement of the tubular sections in the sections to be compressed is realized for at least one tubular section such that it is pushed onto the sleeve so that it surrounds the section to be compressed in the radial direction. This is associated not only with especially simple, precise positioning, but also enables a high-precision localized application of force in the compression process, especially through the use of a compression tool that applies force, at least at the start of the compression process, mainly on the pushed-on tubular section.

According to a preferred refinement of this embodiment of the method, it is provided that the compression is performed so that after the compression, the pushed-on tubular section is aligned with sections of the sleeve on which no tubular section is pushed on.

However, it is also possible that the tubular section is pushed into the sleeve. This is provided, in particular, when the strength of the sleeve is too low to achieve the required annular clamping force or when a homogeneous surface of the electrical heating device is required.

It is especially preferred when the possibility for creating precisely defined, non-compressed or weakly compressed areas is used so that at least one electronic component, especially a sensor, a fuse, and/or a switch, is arranged in the sleeve. This is preferably realized in that the electronic component is arranged together with the electrical heating element in the sleeve, that is, in particular, as a preconfigured assembly.

Therefore, because a tubular section is arranged on the sleeve so that it projects past the sleeve, in particular, past an end side of the sleeve, in particular, the possibility is created to produce the electrical heating device with a closed area with defined properties. For example, in this way, an undesired flow of heat in the direction toward the connections of the electrical heating device can be largely prevented. In particular, it is possible that another tube that concentrically extends the sleeve is arranged in the area of the tubular section projecting past the sleeve.

It can be advantageous to rework the bottom of the sleeve after the compression process, especially so that a flat end surface is produced, which can be realized, for example, by a metal-cutting process on the bottom. Simultaneously, however, it is to be noted that due to the method according to the invention, for an adapted selection of the degree of compression of the respective areas, in many cases, a deformation of the end face during the compression process can be avoided, so that such a reworking step becomes unnecessary.

BRIEF DESCRIPTION OF THE SEVERAL VIEWS OF THE DRAWINGS

The foregoing summary, as well as the following detailed description of the preferred invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

If arrows are drawn in figures that still show non-compressed electrical heating devices, these arrows indicate the direction of the compression of the system or method.

Figure 1A:
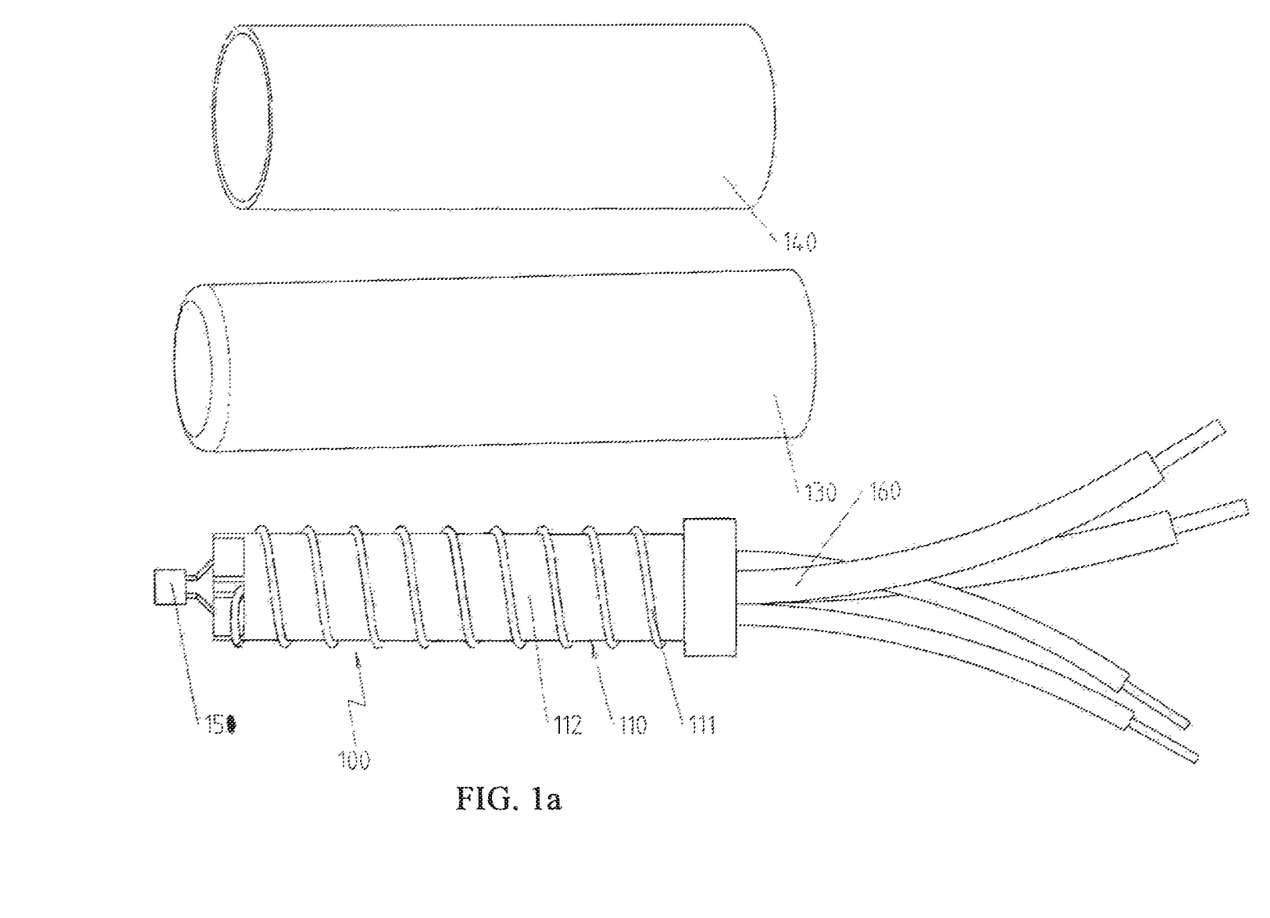
FIG. 1a is a side perspective view of prepared components of a first preferred embodiment of an electrical heating device in accordance with the present invention.

FIG. 1a shows the partially preconfigured components of an electrical heating device 100 prepared for performing the additional processing steps in accordance with a first preferred embodiment. This figure shows, in particular, the electrical heating element 110 constructed as coil body 112 wound with a resistance wire 111, and the sleeve 130 made from copper and the tubular section 140 made from stainless steel. Naturally, copper and stainless steel have their own strength values, and the strength of stainless steel is higher than that of copper.

The electrical heating element 110 is also preconfigured here to the extent that an electronic component 150, namely here a temperature sensor, is arranged on the coil body on the end side and a connection to connecting wires 160 has already been produced.

Figure 1B:
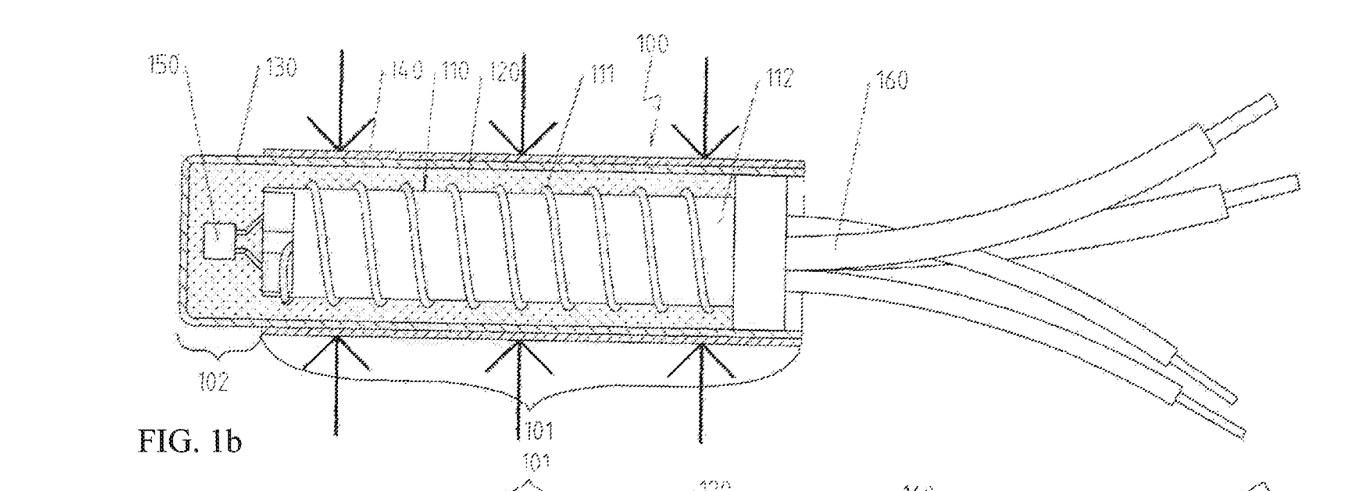
FIG. 1b is a cross-sectional view of the assembled prepared components of FIG. 1a before the compression process.

In the representation of the electrical heating device 100 before the processing step of the at least section-wise compression in FIG. 1b, the electrical heating element 110 has been arranged in the sleeve 130 and the filler material 120 has been arranged in the form of magnesium oxide powder also in the sleeve 130, so that parts of the electrical heating element 110 carrying current, namely the resistance wire 111, are electrically isolated from the sleeve 130 and the position of the electrical heating element 110 in the sleeve 130 is fixed.

Figure 1C:
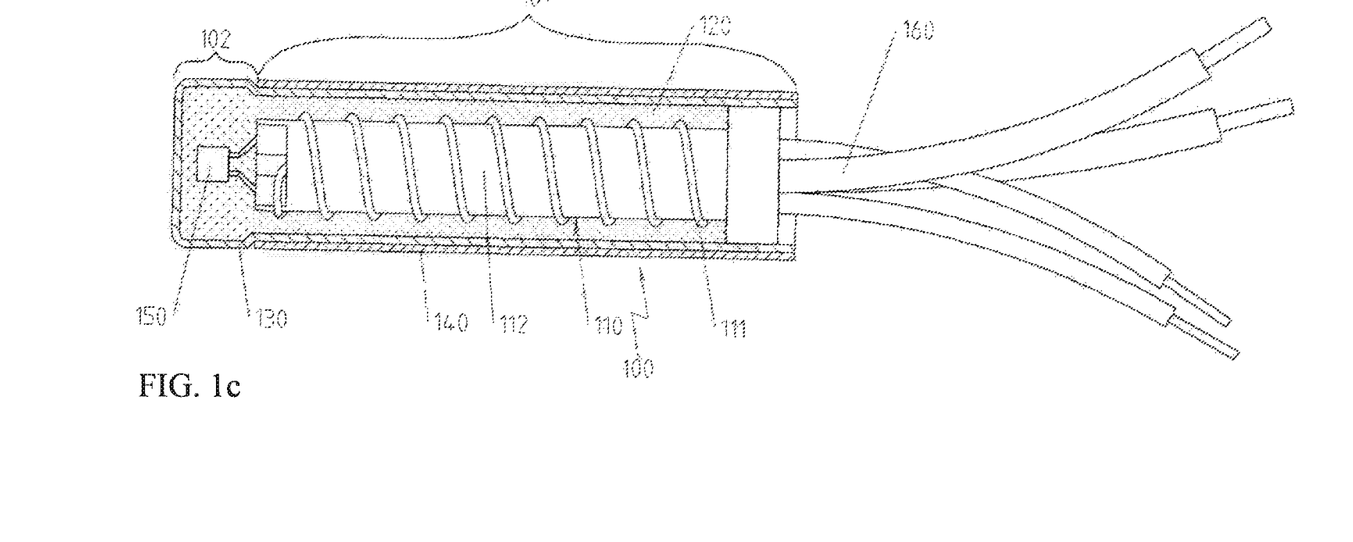
FIG. 1c is a cross-sectional view of the electrical heating device produced from the components from FIG. 1a after the compression process.

By means of the processing step of the at least section-wise compression of the electrical heating device 100, this arrangement can then be transformed into the shape shown in FIG. 1c. In particular, only a compression of the area of the tubular section 140 made from stainless steel was performed here, so that it has a compressed section 101 and a non-compressed section 102, in which the electronic component 150 is arranged. Here, the compression was performed so that the tubular section 140 is now aligned with the profile of the sleeve 130 in the non-compressed section 102 of the electrical heating device 100.

Figure 2:
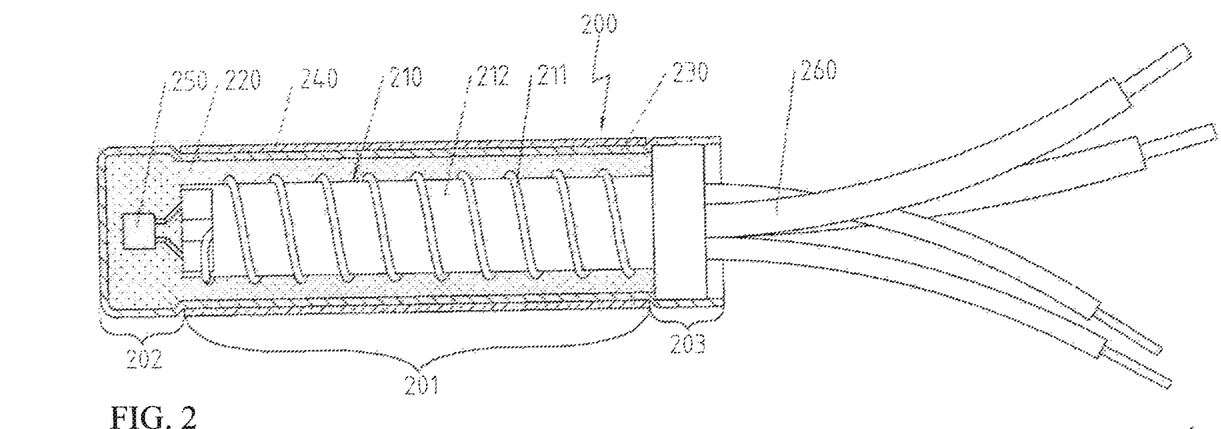
FIG. 2 is a cross-sectional view of a second preferred embodiment of an electrical heating device that can be produced with the preferred method after the compression process.

FIG. 2 shows a second preferred embodiment of an electrical heating device 200 that can be produced with the method with compressed section 201, non-compressed sections 202,203, electrical heating element 210 with resistance wire 211 and wound coil body 212, filler material 220, sleeve 230, tubular section 240, electronic component 250, and connecting wires 260 after the at least section-wise compression process.

The difference with the electrical heating device 100 of the first preferred embodiment relative to the second preferred electrical heating device 200 is that the tubular section 240 does not include the connection-side end area of the electrical heating device 200 and the sleeve 230, so that a second non-compressed area 203 is created. This can be useful, for example, for many kinds of electrical connections between connecting wires 260 and the electrical heating element 210 and/or the electronic component 250.

Figure 3:
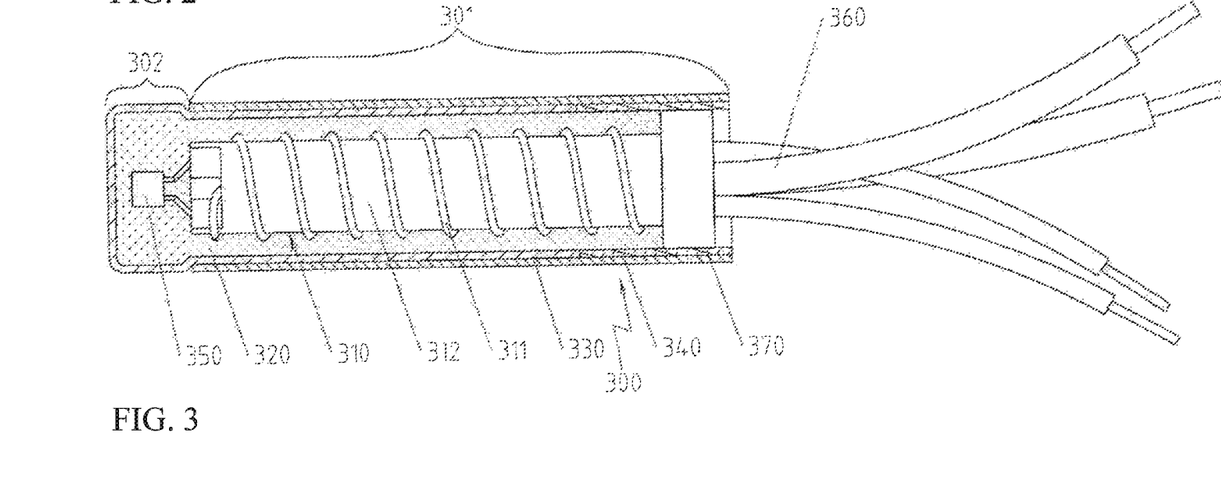
FIG. 3 is a cross-sectional view of a third preferred embodiment of an electrical heating device that can be produced with the preferred method after the compression process.

FIG. 3 shows a third preferred embodiment of an electrical heating device 200 that can be produced with the method with compressed section 301, non-compressed sections 302,303, electrical heating element 310 with resistance wire 311 and wound coil body 312, filler material 320, sleeve 330, tubular section 340, electronic component 350, and connecting wires 360 after the at least section-wise compression.

Differently than for the electrical heating device 200 of the second preferred embodiment, for the electrical heating device 300 of the third preferred embodiment, the tubular section 340 projects past the connection-side end area of the sleeve 330, wherein an additional tube 370, in this embodiment, again a stainless steel tube, is arranged in the area of the tubular section 340 projecting past the sleeve 330, wherein this tube concentrically extends the sleeve 330. In this way, the heat transport to the connection side can be reduced.

Figure 4A:
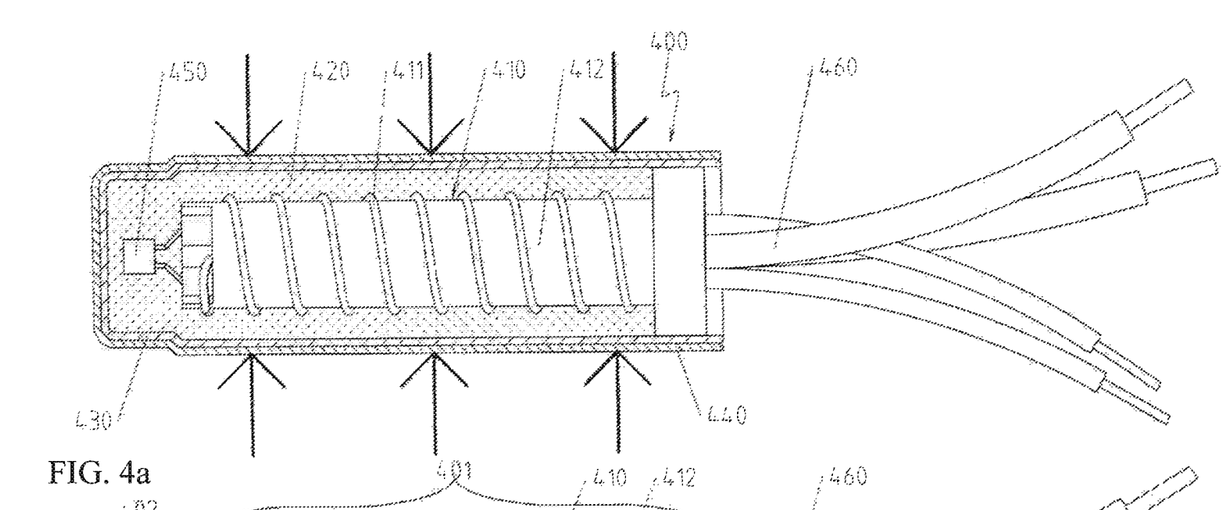
FIG. 4a is a cross-sectional view of a fourth preferred embodiment of an electrical heating device that can be produced with the method before the compression process.
Figure 4B:
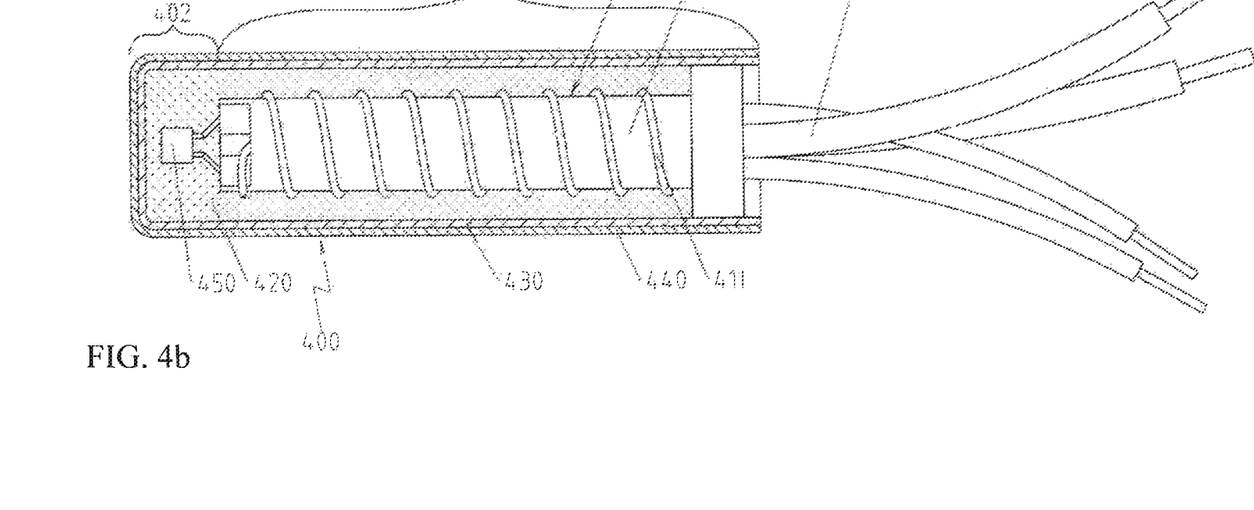
FIG. 4b is a cross-sectional view of the heating device from FIG. 4a after the compression process.

FIGS. 4a and 4b show a fourth preferred embodiment of an electrical heating device 400 that can be produced with the method with compressed section 401, non-compressed section 402, electrical heating element 410 with resistance wire 411 and wound coil body 412, filler material 420, sleeve 430, tubular section 440, electronic component 450, and connecting wires 460 before and after the at least section-wise compression, respectively.

The difference with the electrical heating device 100 of the first preferred embodiment relative to the fourth preferred electrical heating device 400 consists in that the tubular section 440 is part of another sleeve 441 surrounding the sleeve 430, wherein both sleeves 430, 441 each have a larger cross section in the area to be compressed before the compression process than in the area not to be compressed.

Figure 5A:
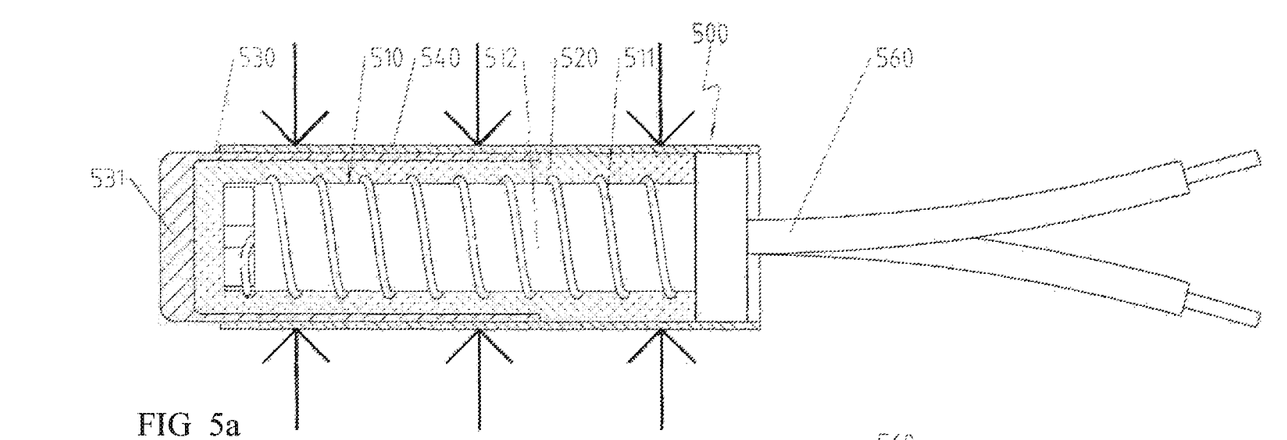
FIG. 5a is a cross-sectional view of a fifth preferred embodiment of an electrical heating device that can be produced with the method before the compression process.
Figure 5B:
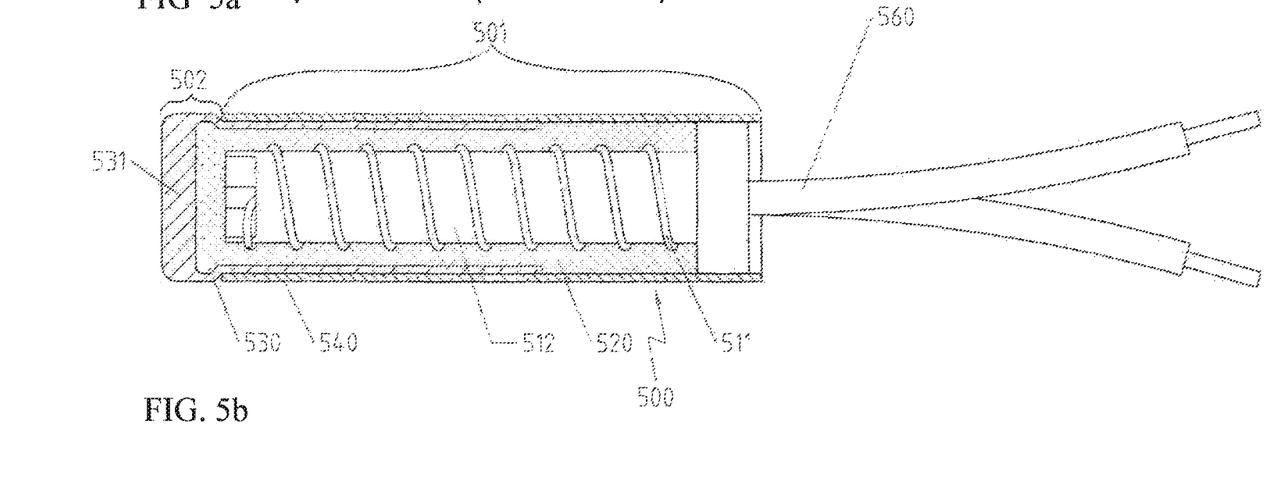
FIG. 5b is a cross-sectional view of the heating device from FIG. 5a after the compression process.

FIGS. 5a and 5b show a fifth preferred embodiment of an electrical heating device 500 that can be produced with the method with compressed section 501, non-compressed section 502, electrical heating element 510 with resistance wire 511 and wound coil body 512, filler material 520, sleeve 530, tubular section 540, and connecting wires 560 before and after the at least section-wise compression, respectively.

The electrical heating device 500 of the fifth preferred embodiment is related to the third preferred electrical heating device 300 in that, like in that third preferred electrical heating device 300, the tubular section 540 projects past the sleeve 530 in the connection-side direction. Differently than in the third preferred electrical heating device 300, however, in the fifth preferred embodiment according to FIGS. 5a and 5b, no other tube is arranged in this area. Another difference with the electrical heating device 300 of the third preferred embodiment is that the sleeve 530 of the fifth preferred electrical heating device 500 has a reinforced bottom 531 with significantly increased wall thickness. This is preferred especially if any deformation of this bottom during the compression process is to be compensated for, in particular, by metal-cutting rework processes, e.g., by dressing. In addition, there is also no electronic component.

Figure 6:
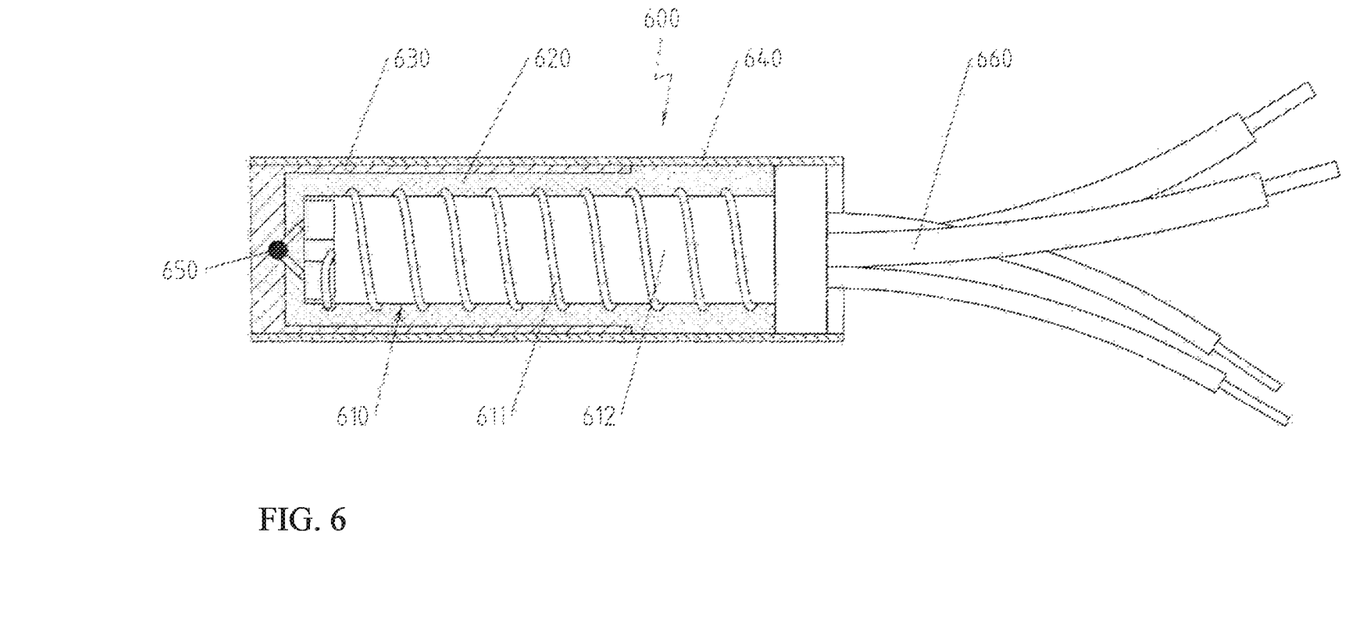
FIG. 6 is a cross-sectional view of a sixth preferred embodiment of an electrical heating device that can be produced with the method after the compression process.

FIG. 6 shows a sixth preferred embodiment of an electrical heating device 600 that can be produced with the method with compressed section 601, electrical heating element 610 with resistance wire 611 and wound coil body 612, filler material 620, sleeve 630, tubular section 640, and connecting wires 660 after the compression process.

The electrical heating device 600 of the sixth preferred embodiment is structurally similar to the electrical heating device 500 of the fifth preferred embodiment, but differently than in the third preferred embodiment, there is a thermocouple element 650 in the sixth preferred embodiment on the bottom side and the tubular section 640 completely houses the sleeve 630.

Figure 7A:
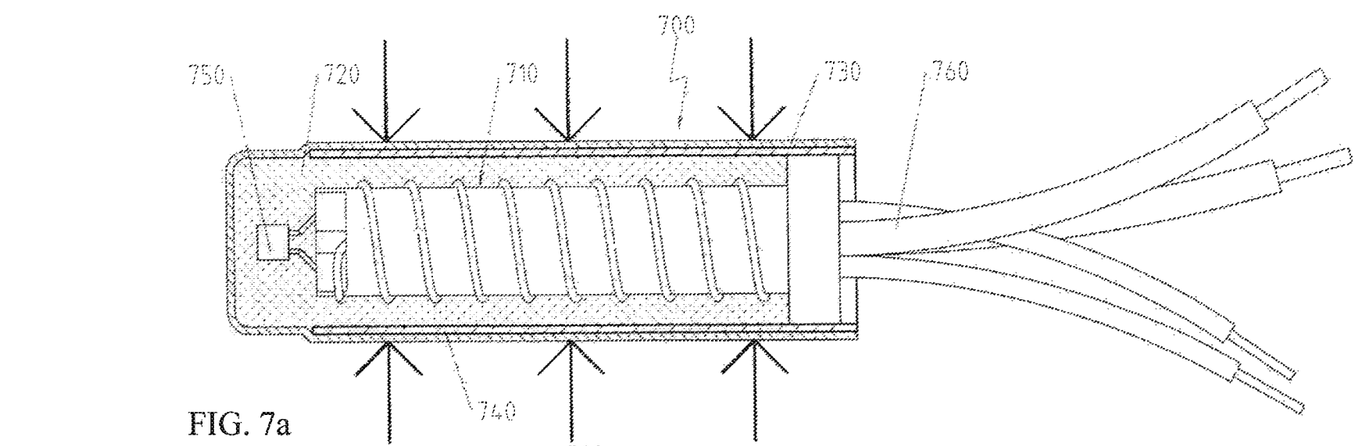
FIG. 7a is a cross-sectional view of a seventh preferred embodiment of an electrical heating device that can be produced with the method before the compression process.
Figure 7B:
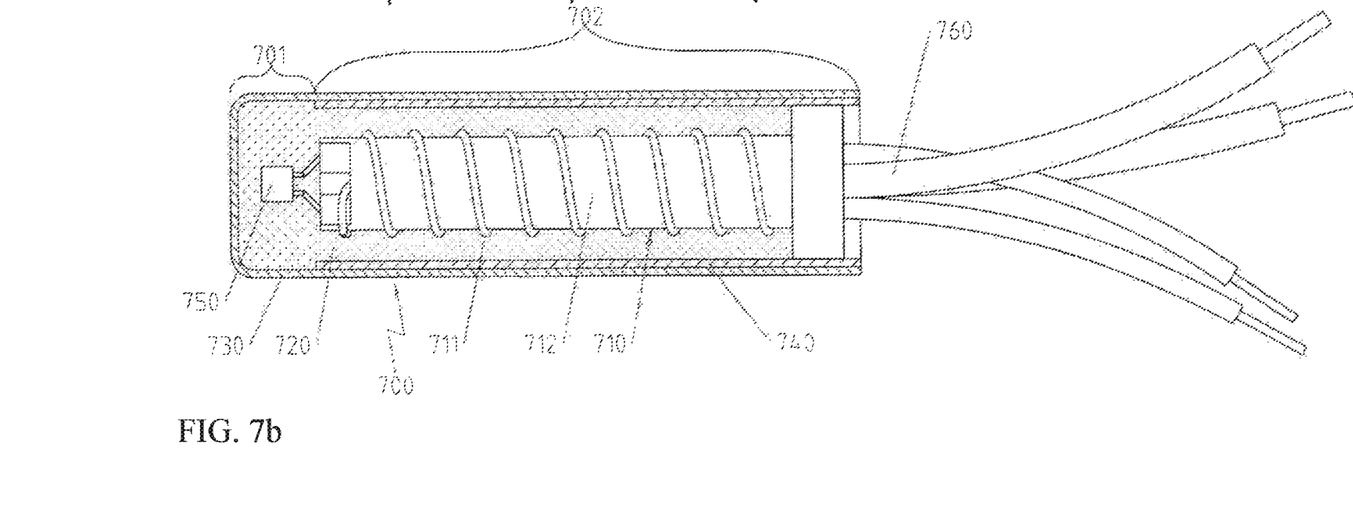
FIG. 7b is a cross-sectional view of the heating device from FIG. 7a after the compression process.

FIGS. 7a and 7b show a seventh preferred embodiment of an electrical heating device 700 that can be produced with the method with compressed section 701, non-compressed section 702, electrical heating element 710 with resistance wire 711 and wound coil body 712, filler material 720, sleeve 730, tubular section 740, electronic component 750 and connecting wires 760 before and after the at least section-wise compression process, respectively.

The difference with the electrical heating device 100 of the first preferred embodiment according to FIGS. 1a to 1c consists in that the tubular section 740 of the seventh preferred embodiment is pushed into and not onto the sleeve 730.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

LIST OF REFERENCE SYMBOLS 100,200,300,400,500, 600,700 Electrical heating device
101,201,301,401,501, 601,701 Compressed section
102,202,302,303,402, 403,502,602 Non-compressed section
110,210,310,410,510, 610,710 Electrical heating element
111,211,311,411,511, 611,711 Resistance wire
112,212,312,412,512, 612,712 Coil body
120,220,320,420,520, 620,720 Filler material
130,230,330,430,530, 630,730 Sleeve
140,240,340,440,540, 640,740 Tubular section
150,250,350,450,550, 750 Electronic component
370 Tube
441 Sleeve
531 Bottom
650 Thermocouple element

What is claimed is:

1. A method for producing an electrical heating device comprising the steps of:
   preparing a sleeve from a first material that has a first strength,
   arranging an electrical heating element in the sleeve,
   arranging a filler material in the sleeve, so that parts of the electrical heating element carrying current are electrically isolated from the sleeve and a position of the electrical heating element in the sleeve is fixed,
   arranging a tubular section radially upon or within at least one section of the sleeve, the tubular section being made from a second material that has a second strength that is greater than the first strength; and
   compressing the at least one section of the sleeve having the tubular section, including the electrical heating element and the filler material arranged therein, whereby the at least one section of the sleeve having the tubular section is compressed to a greater degree than other sections of the sleeve without the tubular section, resulting in greater compaction of the at least one section of the sleeve having the tubular section relative to the other sections of the sleeve without the tubular section.

2. The method according to claim 1, wherein the preparing step comprises preparing the sleeve from copper, aluminum, titanium, or brass.

3. The method according to claim 1, wherein the tubular section is made from steel and is arranged for sections to be compressed.

4. The method according to claim 3, wherein the tubular section is made from stainless steel.

5. The method according to claim 1, wherein the step of arranging a tubular section comprises pushing the tubular section onto the sleeve.

6. The method according to claim 5, wherein the compressing step results in aligning the pushed-on tubular section with sections of the sleeve on which no tubular section is pushed on.

7. The method according to claim 1, wherein the step of arranging a tubular section comprises pushing the tubular section into the sleeve.

8. The method according to claim 1, further comprising the step of arranging wherein at least one electronic component in the sleeve.

9. The method according to claim 8, wherein the step of arranging at least one electronic component comprises arranging the at least one electronic component together with the electrical heating element in the sleeve.

10. The method according to claim 8, wherein the at least one electronic component comprises a sensor, a fuse, and/or a switch.

11. The method according to claim 1, wherein the step of arranging the tubular section comprises projecting a portion of the tubular section past the sleeve.

12. The method according to claim 11, further comprising the step of positioning an additional tube in the portion of the tubular section projecting past the sleeve, thereby concentrically extending the sleeve.

\* \* \* \* \*